Dec. 16, 1941.   G. L. LARISON   2,266,491
COMPENSATING WHEEL MOUNTING FOR VEHICLES
Filed May 2, 1940   2 Sheets-Sheet 1

Inventor
Glenn L. Larison
By T. J. Geisler
and F. R. Geisler
Attorneys

Dec. 16, 1941.  G. L. LARISON  2,266,491
COMPENSATING WHEEL MOUNTING FOR VEHICLES
Filed May 2, 1940  2 Sheets-Sheet 2

Inventor
Glenn L. Larison
By T. J. Geisler
and F. R. Geisler
Attorneys

Patented Dec. 16, 1941

2,266,491

UNITED STATES PATENT OFFICE 2,266,491

COMPENSATING WHEEL MOUNTING FOR VEHICLES

Glenn L. Larison, La Grande, Oreg., assignor to Larison Compensating Axle Corporation, a corporation of Oregon Application May 2, 1940, Serial No. 333,009

4 Claims. (Cl. 280—81)

This application is a continuation in part taken from my co-pending application, Ser. No. 223,275, filed under date of August 5, 1938, which issued May 7, 1940 as United States Patent No. 2,199,409.

This invention relates to vehicles of various types, but, more particularly, to trucks and trailers of the heavy duty type in which multiple wheels are necessary for properly carrying the load.

In vehicles of this character it is customary to provide a plurality of wheels in pairs in order to obtain greater load-carrying efficiency. In my invention I also use wheels in pairs but mount each wheel separately and permit each wheel separately to be raised above the other wheels.

An object of my invention is to mount the vehicle wheels, arranged in pairs, in such manner that each and every wheel will carry its share of the load at all times regardless of the irregularities in the surface of the roadway.

A further object of my invention is to furnish a compensating device thru the medium of the mounting of the wheels in each pair, whereby relative movement will be permitted of the wheels in each pair in such manner as to compensate, to a considerable extent, for such irregularities in the road surface, and thereby minimize the raising, lowering or tilting of the vehicle frame or body which would normally occur due to bumps, depressions or other irregularities in the road surface; and also minimize the jars and shocks when the vehicle is passing over such rough surfaces.

Various means for permitting compensation in the mounting of vehicle wheels arranged in pairs have been tried out with more or less success, but such devices generally require the tilting of the spindles of the wheels from the horizontal in order to permit one wheel to be raised higher than the other and thus to function in the manner of a compensating device. But the tilting of the wheel spindles from the horizontal necessitates a lateral slipping of the wheels on the road surface, that is to say, as the wheels are raised or lowered they are shoved slightly laterally on the road surface. This lateral movement back and forth, which will occur constantly while the wheels are rolling over rough surfaces, has been found to result in considerable extra wear on the tires.

A special object of my invention, accordingly, is to provide a compensating mounting for each pair of wheels in which such tilting of the wheels or wheel spindles does not occur, and in which the wheels will rotate in parallel vertical planes with the space between the planes of the wheels remaining constant, and thus eliminating the objectionable side slippage of the wheels on the road.

A still further object of my invention is to provide means for limiting the downward and upward movement of each wheel mounting or wheel spindle with respect to the companion wheel spindle in each pair, whereby, in the event of the entire failure of one wheel, the other wheel of the pair will function to sustain the load previously carried by both wheels and thus permit temporary further travel of the vehicle under such condition.

The above mentioned and incidental objects I attain by providing wheel spindle assemblies in pairs, with each spindle assembly separately hinged to a frame member such as a longitudinal beam or walking beam, in such way that each wheel assembly may oscillate vertically without lateral displacement; and further by connecting each pair of wheel assemblies in such manner that an upward movement or upward thrust of one wheel assembly will cause a force in the opposite direction to be exerted on the other assembly; and by providing suitable stops limiting such oscillation.

These features will be apparent from the following description with reference to the attached drawings illustrating practical embodiments of my invention.

Figure 1:
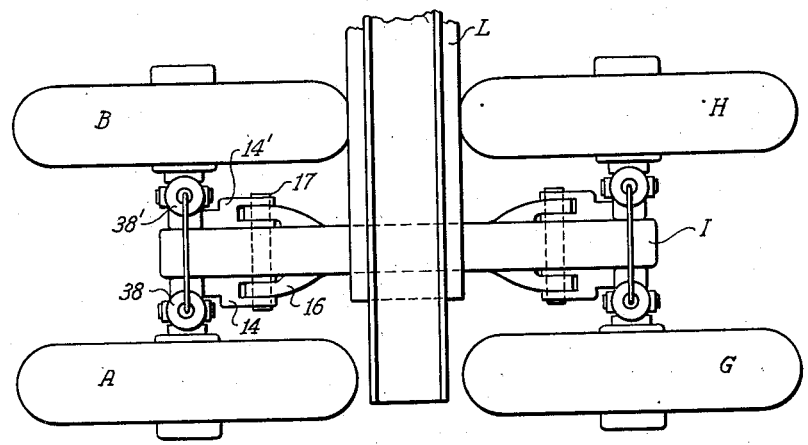
Figure 1 is a schematic plan view of one-half of a heavy duty eight-wheel trailer (of the type illustrated in Figure 1 of my co-pending application, Ser. No. 223,275), embodying the principles of my invention and showing one of the two "walking beams" of such trailer to which I hinge pairs of wheel-carrying assemblies with compensating means connecting the wheel assemblies of each pair.
Figure 2:
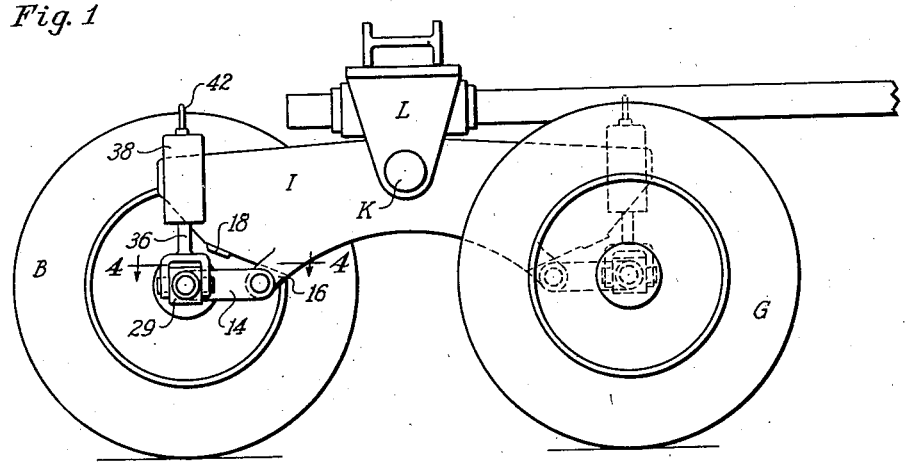
Figure 2 is a schematic side elevation of the trailer vehicle of Figure 1 with one of the nearside wheels removed for the sake of clarity.

Referring first to Figures 1 and 2, the trailer vehicle, of which part is illustrated, includes a transverse bolster L to which a pair of "walking beams" such as I (only one of which is shown in the drawings) are pivotally connected as shown at K.

The wheel-carrying assemblies in my invention are arranged in pairs. Each wheel is permitted independent vertical movement and each wheel carries its full share of the load at all times, as will hereinafter be apparent. The wheels A and B are mounted on spindle-carrying assemblies hinged at one end of the "walking beam" I, and the wheels G and H are mounted in like manner at the other end of the "walking beam." Since these pairs of wheel-carrying assemblies are identical, only one pair need be described, namely the assemblies for the wheels A and B.

Figure 4:
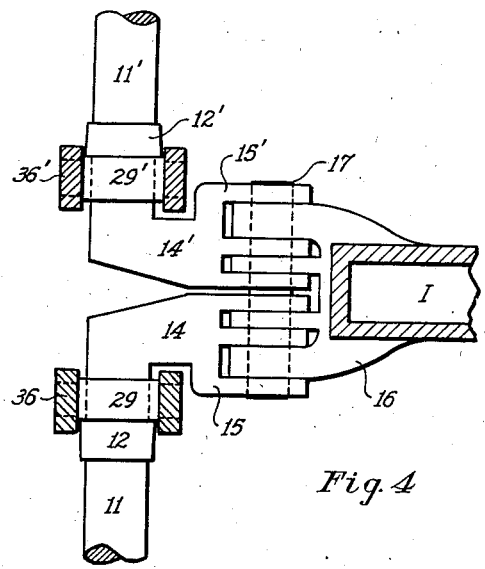
Figure 4 is a fragmentary sectional plan taken on the line 4—4 of Figure 2, but showing the wheels removed from the spindles.

The wheels A and B are rotatably mounted on the spindles 11 and 11' respectively, in abutment with the fixed collars 12 and 12'. The spindle 11 is formed integral with or rigidly secured to an arm 14, and the spindle 11' is likewise formed on, or secured to, a similar arm 14'. The spindles extend from opposite sides of the "walking beam" I, and are perpendicular to the vertical plane of the "walking beam" as shown in the sectional plan Figure 4. The inner ends of the arms 14 and 14' are bifurcated to form hinge portions 15 and 15' which register with similar bifurcations of a hinge fixture 16, integral with the "walking beam" I, in such a manner that the hinged arms 14 and 14' may swing independently in vertical arcs about the common hinge pin 17, the hinge pin 17 being perpendicular to the vertical plane of the "walking beam" I, and thus parallel to the spindles 11 and 11'. The hinge fixture 16 is set in a suitable recess at the bottom of the "walking beam" I to permit limited upward movement of the spindle arms 14 and 14' as shown in Figure 2. The limit of such upward pivotal movement of the spindle arms 14 and 14' may be definitely established by the provision of a stop plate 18 of the required thickness firmly attached to the "walking beam" I. These hinged spindle arms with their hinge connection to the "walking beam" I thus permit up and down movement of the wheel spindles without any side or lateral movement of the spindles with respect to the "walking beam" I and constitute a very important part of my invention, since they allow independent movement of the vehicle wheels in planes which are spaced constantly the same distance apart. The plane of rotation of the wheel A, for example, is not changed by the upward thrust of any uneven road surface but is confined by the spindle arm 14 to the normal plane of rotation parallel to the "walking beam" I at a constant distance therefrom. Consequently no tilting of the wheel or any sidewise slippage of the wheel on the road surface occurs as a result of such upward thrust.

The suitable plates 18 (Figure 2) definitely establish the extent of upward travel of the spindle arms 14 and 14' and thus the downward movement of the "walking beam" I with respect to the supporting wheels. In the event of fracture or complete failure of one of the wheels or its spindle, the end of the "walking beam" I can drop only until the stop plate 18 abuts the spindle arm of the other wheel of the pair. The other wheel then carries a double load, but during this emergency there is no danger of the vehicle changing its course or leaving the road. The stops 18 may be so arranged that a distance that the walking beam is permitted to drop under such conditions will be less than the effective depth of the pneumatic tires on the wheels of the vehicle, so that in case of complete loss of air in one tire the action previously described takes place and the load on that wheel is shifted to the companion wheel of the pair, and the defective tire does not have the rim of the wheel resting on it.

Figure 3:
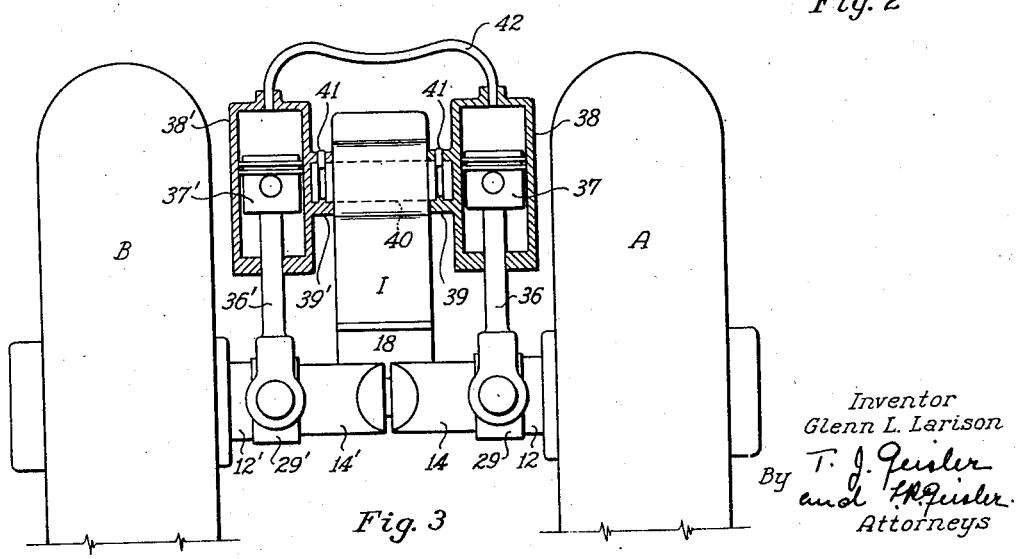
Figure 3 is an end elevation, partly in section, of the "walking beam" and one of the pairs of wheel-carrying assemblies of Figures 1 and 2, showing more clearly, and on a larger scale, the particular compensating means which I employ for connecting the two wheel-carrying assemblies.

The spindles 11 and 11' (Figure 4) carry pivot blocks 29 and 29' adjacent the fixed collars 12 and 12'. Upstanding rods 36 and 36' are bifurcated at their lower ends and are pivotally mounted on the pivot blocks 29 and 29' respectively. Hydraulic pistons 37 and 37' (Figure 3) are pivotally disposed on the upper ends of these rods 36 and 36' and are adapted to reciprocate in hydraulic cylinders 38 and 38' respectively. In order to compensate for the arcuate movement of the ends of the spindle arms 14 and 14' each of the cylinders 38 and 38' is formed with a hollow boss 39 and 39' bored to receive the ends of a shaft 40 extending through the "walking beam" I. Pins 41 firmly secured in the bosses 39 and 39' coact with grooves in the shaft 40 to hold the cylinders in place and permit slight arcuate movement in parallel vertical planes. The space above the pistons 37 and 37' is filled with a suitable liquid such as oil, and a flexible tube 42 places the two cylinders in communication so that as one of the pistons 37 or 37' is forced upwardly by the vertical movement of the respective wheel, the fluid in that particular cylinder is forced to pass through the tube 42 into the other cylinder where it exerts a downward force on the piston disposed therein.

Figure 5:
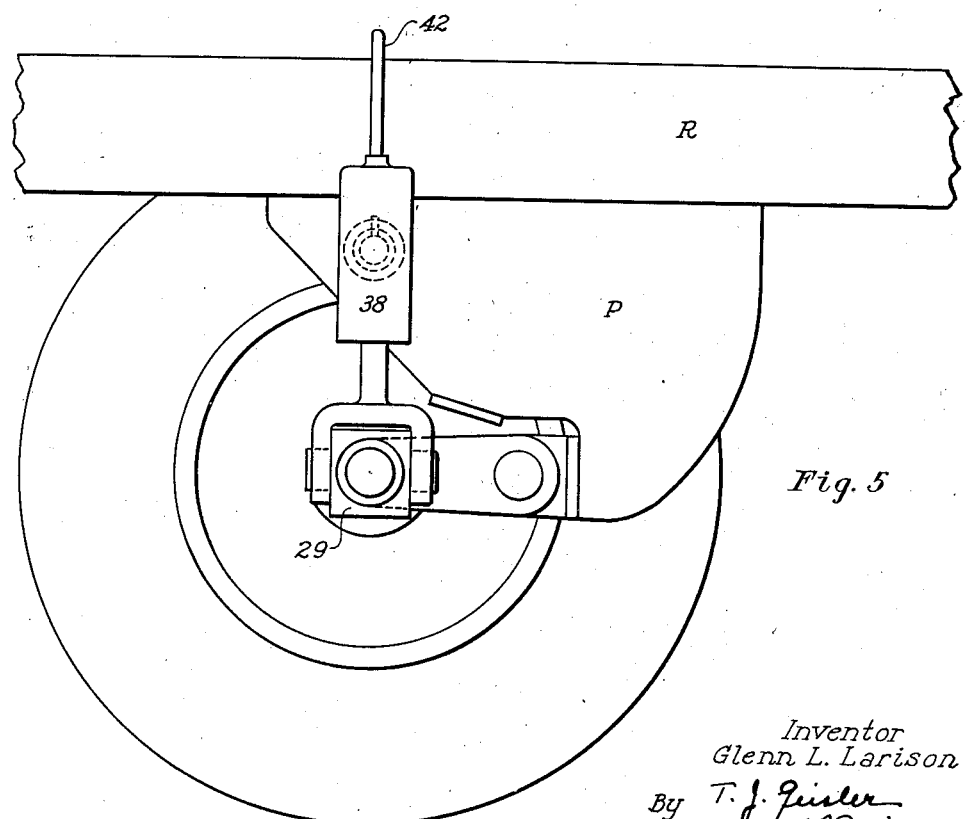
Figure 5 is a side elevation of the rear portion of a vehicle chassis supported on four wheels and also embodying the principles of my invention, the near-side wheel having been removed.

In the vehicle shown in part in Figure 5, there are no "walking beams." At each side of the vehicle a wheel assembly supporting member P is made rigid to the vehicle chassis R, and a pair of wheel-carrying assemblies are hinged to the bottom of the member P as shown in Figure 5. The construction of the wheel-carrying assemblies is the same as previously described, and the means of compensating the up and down movement of the assemblies, and thus of the wheels of each pair, is also the same as previously explained. The hydraulic cylinders 38 in this case are mounted on opposite sides of the member P, the manner of their mounting being the same as that described with reference to the mounting on the "walking beam" I in Figure 3. These hydraulic cylinders are similarly-connected with the flexible tube 42, a hydraulic piston reciprocates in each hydraulic cylinder, and a rod is pivotally connected to each hydraulic piston at the top and pivotally-mounted on a pivot block 29 at the bottom in the same manner as described with reference to Figure 3.

Other modified means may be used for mounting the hydraulic compensating means and for connecting such hydraulic means to the wheel-carrying assemblies, respectively, without departing from the principles of my invention. It is essential, however, that each wheel-carrying assembly be separately hinged to a wheel-assembly supporting member, that each assembly be permitted limited up and down movement, be held against lateral movement, and that the wheel-carrying assemblies in each pair be connected by suitable hydraulic means so arranged that upward movement of one wheel-carrying assembly of the pair will cause a force to be transmitted through the particular means to cause a force to be exerted on the other wheel-carrying assembly of the pair in the opposite direction.

I claim:

1. In a vehicle, a wheel-assembly supporting member, a pair of wheel-carrying arms hinged to said member for up and down movement, a wheel spindle on each arm, said spindles extending in opposite directions, a ground-engaging wheel on each spindle, the hinges of said arms being substantially parallel to said spindles whereby said wheels will always be spaced the same distance apart, hydraulic compensating means connecting said arms so arranged and constructed that an upward thrust on one of said arms will cause a force to be exerted in the opposite direction on the other arm, whereby each wheel will be caused to carry an equal share of the vehicle load at all times, said compensating means including a pair of cooperating hydraulic pistons connected to said arms respectively, a hydraulic cylinder for each piston, and liquid conducting means connecting said cylinders.

2. In a vehicle, a wheel-assembly supporting member, a pair of wheel-carrying arms hinged to said member for up and down movement in parallel planes, a wheel spindle on each arm, said spindles extending in opposite directions and normally in transverse horizontal alignment, a ground-engaging wheel on each spindle, the hinges of said arms being substantially parallel to said spindles, hydraulic compensating means connecting said arms so arranged and constructed that an upward thrust on one of said arms will cause a force to be exerted in the opposite direction on the other arm, whereby each wheel will be caused to carry an equal share of the vehicle load at all times, said compensating means including a pair of cooperating hydraulic pistons connected to said arms respectively, a hydraulic cylinder for each piston, said cylinders supported on said member, and liquid conducting means connecting said cylinders.

3. In a vehicle, a wheel-assembly supporting member, a pair of wheel-carrying arms hinged to said member for up and down movement, a wheel spindle on each arm, said spindles extending in opposite directions, a ground-engaging wheel on each spindle, the hinges of said arms being substantially parallel to said spindles whereby said wheels will always be spaced the same distance apart, hydraulic compensating means connecting said arms so arranged and constructed that an upward thrust on one of said arms will cause a force to be exerted in the opposite direction on the other arm, whereby each wheel will be caused to carry an equal share of the vehicle load at all times, said compensating means including a pair of cooperating hydraulic pistons connected to said arms respectively, a hydraulic cylinder for each piston, said cylinders pivotally-mounted on opposite sides of said member, and liquid conducting means connecting said cylinders.

4. In a vehicle, a walking-beam, a pair of wheel-carrying arms hinged to said walking-beam for up and down movement, a wheel spindle on each arm, said spindles extending in opposite directions, a ground-engaging wheel on each spindle, the hinges of said arms being substantially parallel to said spindles, hydraulic compensating means connecting said arms so arranged and constructed that an upward thrust on one of said arms will cause a force to be exerted in the opposite direction on the other arm, whereby each wheel will be caused to carry an equal share of the vehicle load at all times, said compensating means including a pair of cooperating hydraulic pistons connected to said arms respectively, a hydraulic cylinder for each piston, said cylinders supported on said walking-beam, and liquid conducting means connecting said cylinders.

GLENN L. LARISON.